Aug. 25, 1953     W. F. SKEATS     2,650,334
ELECTRIC CAPACITOR
Filed Dec. 21, 1950     2 Sheets-Sheet 1
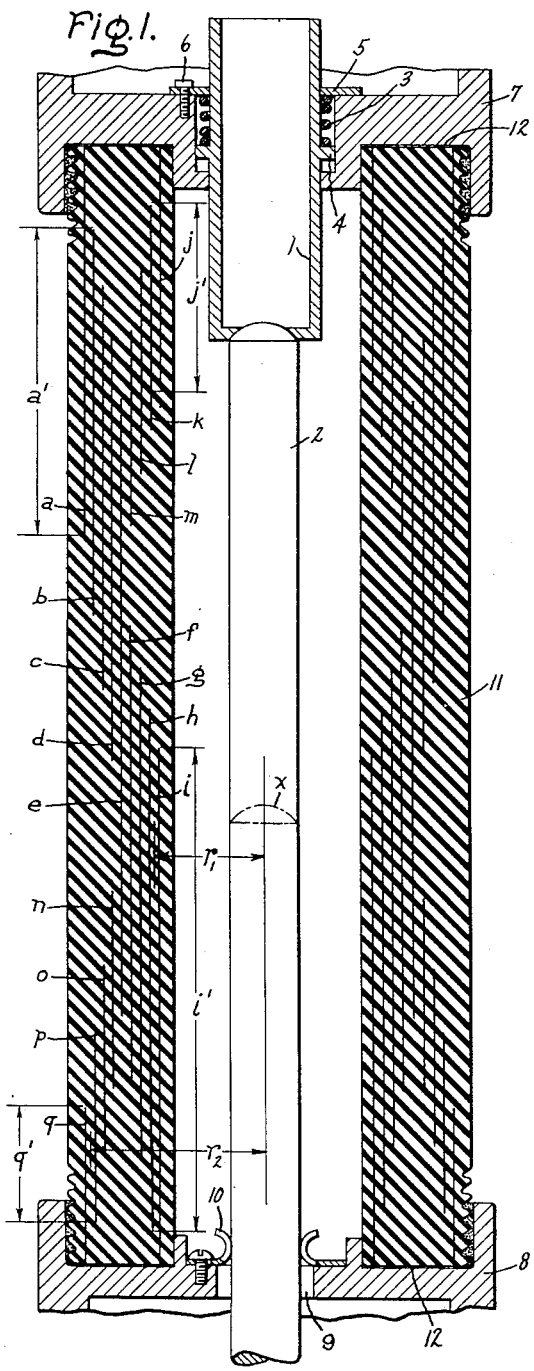
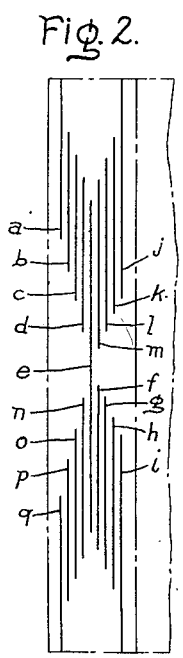
Inventor:
Wilfred F. Skeats,
by Ernest C. Britton
His Attorney.

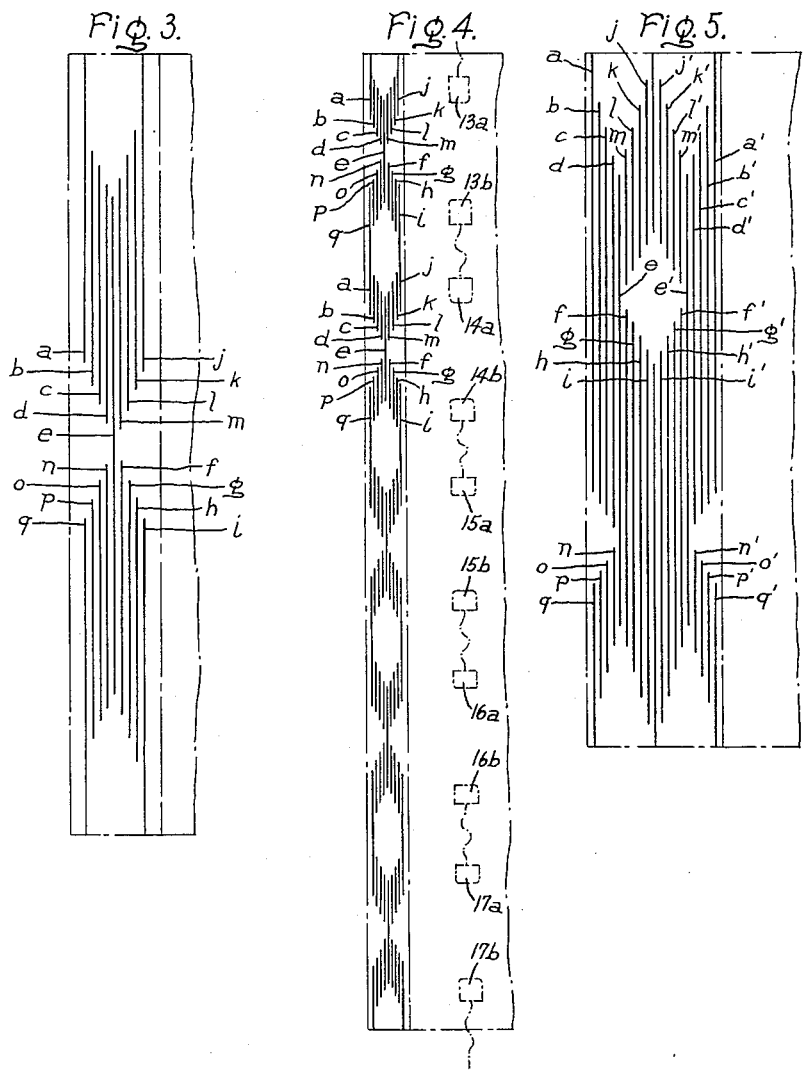

Patented Aug. 25, 1953

2,650,334

UNITED STATES PATENT OFFICE 2,650,334

ELECTRIC CAPACITOR

Wilfred F. Skeats, Lansdowne, Pa., assignor to General Electric Company, a corporation of New York Application December 21, 1950, Serial No. 201,947

5 Claims. (Cl. 317—242)

This invention relates to electric capacitors, and more particularly to capacitors which are constructed of a plurality of metallic elements arranged in a suitable dielectric with respect to each other and with respect to a source of potential so that the distribution of the potential applied to the capacitor can be predetermined in accordance with certain conditions to be fulfilled.

In Patent 2,481,996—Grunewald et al., granted September 13, 1949, an arrangement is disclosed wherein the contacts of a circuit breaker are shunted by capacitance means in the form of a plurality of tubular metallic members embedded in stepped telescopic relationship in another tubular member constructed of insulating material, the tubular structure forming a chamber for enclosing the breaker contacts. As is explained in the above mentioned Grunewald et al. patent, capacitance means in parallel with the contacts of an electric circuit breaker is an aid in certain respects to the interrupting operation of the breaker. A capacitor structure of this type, however, is subjected to voltage stresses which are concentrated at one end of the tube along the inside region thereof, and at the other end of the tube along the outside region thereof. This voltage concentration at the ends of the tubular structure may be disadvantageous since supporting structure disposed at the tube ends and located in the regions of high stress would tend to weaken the overall dielectric strength of the tube.

One object of this invention is to provide an improved capacitor construction wherein regions of voltage stress are disposed intermediate the extremities of the capacitor structure rather than at the extremities thereof.

Another object of the invention is to provide an improved capacitor structure having stepped metallic elements wherein a substantially uniform voltage gradient from the region near one extremity of the capacitor to the region near another extremity thereof is obtainable without causing high stress concentrations at the extremities of the structure.

Still another object of this invention is the provision of a capacitor structure having stepped metallic elements wherein efficient utilization of the dielectric material is possible and wherein the location of regions of stress concentrations are intermediate the extremities of the capacitor structure.

In accordance with the invention, one group of stepped metallic elements of a condenser is embedded in dielectric material and arranged so that the elements are disposed with the remote elements of the group near opposite surfaces of the dielectric and another group of embedded elements is disposed in stepped relationship and arranged in a crosswise fashion with respect to the first mentioned group of elements. Various dimensional relationships can be selected according to the invention, so as to achieve the desired results most advantageously.

The invention will be best understood by reference to the drawings in which Fig. 1 is a schematic representation of an electric circuit breaker embodying a tubular capacitor element constructed according to one aspect of the invention and forming the enclosing structure for the breaker contacts, and in which Figs. 2-5 represent schematically alternative arrangements for the tubular capacitor structure shown in Fig. 1.

In Fig. 1, the numeral 1 represents a relatively fixed contact for an electric circuit breaker, and the numeral 2 represents a relatively movable contact for the circuit breaker. Stationary contact 1 is yieldably mounted due to the biasing action of compressional spring 3 which at its lower extremity engages a flange 4 on contact 1, and which at its upper extremity engages a plate member 5 secured as by bolts 6 to the terminal structure 7. Good electrical contact between the relatively fixed contact 1 and the terminal element 7 could be achieved by a flexible lead interconnecting these two elements, if desired. The circuit breaker is provided with a lower terminal element 8 having therein an opening 9 through which movable contact 2 is reciprocable. Any suitable means for securing good electrical contact between member 8 and contact 2 could be used, such as the fingers 10. Both the end members 7 and 8 threadedly engage the tubular structure 11 constructed of insulating material. Thus the end members 7 and 8 and the tubular structure 11 constitute a housing for the contacts 1 and 2 of the circuit breaker.

As is explained in the above mentioned Grunewald et al. patent, capacitance connected across the contacts of a circuit breaker has certain beneficial effects because capacitance as such is helpful in certain circuit breaker arrangements and also because the distribution of voltage between the contacts when in the open position can be controlled effectively by capacitance elements in shunt with the contacts. This invention is an improvement over the above mentioned Grunewald patent in that capacitor elements embedded within an insulating tubular structure such as tubular element 11 are arranged to obtain improved voltage distribution and to utilize more effectively the dielectric properties of the insulating material forming the tubular structure 11.

The capacitor element disclosed in Fig. 1 comprises a plurality of tubular metallic elements designated by the letters $a$–$i$ which are embedded within the insulating material 11. From Fig. 1 it will be observed that the metallic tubular elements $a$–$i$ constitute one group of stepped tubes or cylinders which become progressively smaller in diameter from the upper end of the member 11 to the lower portion thereof. For convenience, I shall refer to the upper and lower elements $a$ and $i$ respectively as terminal members or elements. Also, it will be observed from Fig. 1 that the tubular metallic members $j$–$m$, $e$, and $n$–$q$, constitute another group of embedded tubes arranged in crosswise fashion with respect to the first mentioned group of tubes $a$–$i$. From Fig. 1 it will be observed that the embedded tube or cylinder $e$ is common to both groups of tubes. For convenience, the embedded tube or cylinders $j$ and $q$ are referred to herein as the terminal elements of the second mentioned group of tubes.

As shown in Fig. 1, one terminal element of each group of embedded elements is in contact with terminal member 7 and one with terminal member 8 so that the elements together with the insulating tube 11 constitute a capacitor arranged in shunt with the contacts 1 and 2. Good contact may be assured if necesary by inserting a thin metal foil, such as is indicated at 12, between the contacting surfaces of the tube 11 and the terminal members 7 and 8.

A set of cylindrical conducting elements progressing from the inside of the tube at one end to the outside at the other end has been referred to as a group. It will be convenient also to refer as a unit to that part of a group which lies between a terminal member and a member common to both groups such as element $e$. Such a set will henceforth be referred to as a series. Thus sets $a$–$e$, $e$–$i$, $j$–$e$, and $e$–$q$ of Fig. 1 will be referred to as series of conducting elements.

It is an established principle of electrical phenomena that, barring the existence of a charge on a conducting element like the embedded elements of this invention, the amount of dielectric flux arriving at that element is the same as the amount of flux leaving it. Furthermore, for the usual dielectric materials operated at commercial frequencies, the magnitude of any charge on any except the terminal elements will be so small as to have negligible effect.

Furthermore, while not quite all of the flux leaving one side of one of these embedded elements enters the adjacent side of the next element, and while also some allowance must be made for fringing flux, the magnitude of these effects will in general be small so that the quantity of dielectric flux passing from one element to the adjacent one on one side through their overlapping area will be the same as that passing from the first element to the adjacent one on the other side through their overlapping area. From this it follows that the dielectric flux passing through the overlapping area of any pair of adjacent elements of a series will be substantially the same as for any other pair of the same series.

If these overlapping areas are made equal throughout any one series, therefore, the dielectric flux density and hence the voltage gradient will be the same in the space between all pairs of embedded elements of the series. This is the condition corresponding to most efficient use of the insulating material so it will be appreciated that the overlapping areas of any one series of conducting elements should be equal.

This principle applies to each of the four series of Figure 1. It does not necessarily apply between the two series of one group of Fig. 1 but does apply to the sum of the overlapping area between adjacent elements of the series $a$–$e$ and the overlapping area between adjacent elements of the series $j$–$e$ as compared with the corresponding sum for the series $e$–$i$ and $e$–$q$. Since these two sums represent, respectively, substantially the total dielectric flux entering and leaving element $e$.

Since the mean radius of the insulating cylinder between elements such as $h$ and $i$ and $j$ and $k$ towards the inside of the cylinder is shorter than that for insulating cylinders between elements such as $a$ and $b$ and $p$ and $q$ towards the ouside of the cylinder, the overlapping lengths between elements such as $a$ and $b$ and $p$ and $q$ should be proportionally less than the overlapping lengths between elements such as $h$ and $i$ and $j$ and $k$ so that their overlapping areas will be equal.

It will be understood from the foregoing that if the overlapping areas of all adjacent pairs of tubes for each series are equal, the radial voltage gradient from the inside of the tube 11 to the outside thereof will be maintained substantially uniform. Furthermore, it will be understood that the longitudinal displacement between corresponding ends of adjacent cylinders of each series should bear a fixed ratio to their difference in radius in order to achieve a uniform longitudinal voltage gradient along that portion of the tube 11 which is disposed intermediate the inner ends of embedded tubes such as $j$ and $i$ for the inside surface of tube 11 and which is disposed between the inner ends of tubes such as $a$ and $q$ along the outside of the tube 11.

To express in simple mathematical form, the content of the last few paragraphs, for maximum electrical utilization of the material of tube 11, the following relationship must be maintained:

$$i' + \frac{r_2}{r_1} \times q' = j' + \frac{r_2}{r_1} \times a'$$

where the letters $i'$, $q'$, $j'$ and $a'$ represent the lengths of overlap as indicated in Fig. 1 and where $r_1$ and $r_2$ represent the radii indicated in that figure. From the above relationship it will be evident that if the embedded tubes or cylinders $i$–$f$ and $a$–$d$ were made longer, and that if the elements $j$–$n$ and $n$–$q$ were made shorter, the effect would be to shift the region of stress on the inside of the tube between elements such as $j$ and $i$ upwardly nearer the contact 1, while the effect on the outside surface of the tube 11 would be to shift the region of stress downwardly nearer the region of the terminal plate 8. Such shifts of the embedded elements in effect amount to changing the capacitance of one group with respect to that of the other group. Thus, according to the invention, the utilization of two groups of embedded elements arranged in crosswise fashion enables one to construct a capacitor element in which efficient use of the dielectric material of the tube such as 11 is made if the above dimensional relationships are adhered to, and which also allows the regions of stress both along the inside surface of the tube and along the outside surface thereof to be positioned longitudinally as desired, subject to the condition that when the stressed region on the inside of the tube is positioned above the center of the tube, the stressed region on the outside must be positioned correspondingly below the center of the tube, and vice versa.

The position of movable contact 2, when that contact is open, is indicated at $x$. Thus it will be seen that the particular arrangement of the embedded elements of Fig. 1 is advantageous since with such an arrangement both the contacts 1 and 2 would be under the protective influence of the terminal members $j$ and $i$ respectively, and the voltage would be properly graded between the contacts by the action of the intermediate tubes such as $k$–$m$, $e$, and $f$–$h$.

From Fig. 1 it will be observed that the region of stress between terminals members $a$ and $q$ along the outside of tube 11 is considerably longer than the region of stress between the terminal members $j$ and $i$ near the inside surface of the tube 11.

Such an arrangement is particularly adapted for an interrupter having high dielectric material within the interrupting housing such as oil or air under pressure. The region of stress on the outside of the tube, being longer, would be characterized by a lower voltage gradient which would be well adapted for the surrounding atmospheric air. It will be understood that the regions of high stress both along the inside and outside surfaces of the tube 11 could be placed directly opposite each other, if desired, by a proper choice of dimensions and by adhering to the relationships set forth above. Such a modification of the arrangement shown in Fig. 1 would be possible without impairing the efficiency of utilization of the dielectric material forming the tube 11 and is illustrated in Fig. 2 which figure like Figs. 3–5 represents a section with htached lines omitted through a wall of a tube such as 11, with the center line of the tube to the right of the section illustrated.

In Fig. 2 the voltage gradient along the outside of the tube is smaller than along the inside of the tube as is the case with the arrangement shown in Fig. 1. At a slight sacrifice in the efficiency of utilization of the dielectric material forming the tube 11, the voltage gradient along the inside of the tube could be made substantially equal to the voltage gradient along the outside of the tube. Such an arrangement is indicated in Fig. 3.

The invention as described thus far has been disclosed in relation to a circuit interrupter unit such as is shown in Fig. 1 in which only a single pair of contacts is used. The invention is also applicable to circuit breakers of the type disclosed in Patent 2,162,588—Prince, granted June 13, 1939, and assigned to the assignee of this invention, in which several pairs of contacts are arranged in series in a single tubular structure. In such multiple contact circuit breakers, it is desirable that the voltage between the terminals of the circuit breaker be distributed uniformly over the several pairs of contacts. The invention is useful in accomplishing this purpose as is indicated in Fig. 4. In Fig. 4 the numerals 13–17 reprsent several pairs of contacts, while the letters $a$ and $b$ used in conjunction with the numerals 13–17 represent cooperating contacts of a particular pair; in other words, the contacts of the breaker are shown schematically as being in the open position, so that when the contacts are closed, 13$a$ would engage 13$b$, etc. As already indicated in connection with Fig. 1, it is desirable to control the distribution of voltage between separable contacts such as 13$a$ and 13$b$. To this end, an arrangement such as is described in connection with Figs. 1–3 for example, is readily adaptable for use in conjunction with each pair of separable contacts. State otherwise, Fig. 4 depicts an arrangement in which several units such as that shown in Fig. 3 can be arranged in series with each other. In this way, it will be noted, not only can the voltage gradient between the two contacts of each pair be controlled, but also the overall distribution of voltage can be controlled so that substantially equal voltages will apply to each pair of contacts when the contacts are open. The manner in which units such as are shown in Fig. 3 are arranged in series is believed to be obvious from an inspection of Fig. 4.

In tube walls which are relatively thick in comparison with their length, the internal embedded cylinders may be arranged so as to form two or more parallel capacitors as is indicated in Fig. 5. In Fig. 5, the letters $a$–$q$ represent an arrangement similar to that indicated by the corresponding letters in Fig. 1, while the primed letters $a$–$q$ represent another similar arrangement in parallel therewith. With the embodiment of the invention shown in Fig. 5, the two parallel arrangements will have cross capacitance effects and will tend to distort each other's voltage distribution unless a symmetrical arrangement similar to that of Fig. 5 is used so that the two arrangements cannot be designed independently of each other, as in the case described in detail in connection with Fig. 1 although the same latitude can be used within each group as is available in Figs. 1–4. With a parallel arrangement such as is shown in Fig. 5, the stressed region on the inside of the tube is opposite to the stressed region on the outside of the tube if an even number of arrangements such as was described in connection with Fig. 1 is used. For certain applications, this may prove an advantageous feature, such for example as when an arrangement such as is shown in Fig. 5 is used as the enclosing structure for a plurality of contacts arranged in series, such as is indicated in Fig. 4, where it may be desirable to keep the overall length of the breaker as short as possible.

While particular embodiments of the invention have been shown and described, I do not wish to be limited thereto, and intend in the appended claims to cover all such changes and modifications as fall within the true spirit and scope of the invention.

What I claim as new and desire to secure by Letters Patent of the United States is:

1. A capacitor adapted to form an enclosing structure for the interrupting means of an electric circuit breaker comprising, a tubular member of dielectric material, a first group of metallic tubular elements embedded in said material and disposed in stepped relationship and with the terminal elements of the group respectively near the inside and outside surfaces of said tubular member, and a second group of metallic tubular elements embedded in said material and disposed in stepped relationship and with the terminal elements of the group respectively near the inside and outside surfaces of said tubular member, one of the terminal elements of one group surrounding one of the terminal elements of the other group and the other terminal element of said one group being disposed within the other terminal element of said other group.

2. A capacitor adapted to form an enclosing structure for the interrupting means of an electric circuit breaker comprising, a tubular member of dielectric material, a first group of metallic tubular elements embedded in said material and disposed in stepped relationship and with the terminal elements of the group respectively near the inside and outside surfaces of said tubular member, and a second group of metallic tubular elements embedded in said material and disposed in stepped relationship and with the terminal elements of the group respectively near the inside and outside surfaces of said tubular member, one of the terminal elements of one group being disposed about one of the terminal elements of the other group and the other terminal element of said one group being disposed within the other terminal element of said other group, at least one of said elements being common to both of said groups.

3. A capacitor adapted to form an enclosing structure for the interrupting means of an electric circuit breaker comprising, a tubular member of dielectric material, a first group of metallic tubular elements embedded in said material and disposed in stepped relationship and with the terminal elements of the group respectively near the inside and outside surfaces of said tubular member, and a second group of metallic tubular elements embedded in said material and disposed in stepped relationship and with the terminal elements of the group respectively near the inside and outside surfaces of said tubular member, one of the terminal elements of one group being disposed about one of the terminal elements of the other group and the other terminal element of said one group being disposed within the other terminal element of said other group, the overlapping areas of any pair of adjacent elements of each group being substantially equal to the overlapping areas of all other pairs of adjacent elements of the same group.

4. A capacitor adapted to form an enclosing structure for the interrupting means of an electric circuit breaker comprising, a tubular member of dielectric material, a first group of metallic tubular elements embedded in said material and disposed in stepped relationship and with the terminal elements of the group respectively near the inside and outside surfaces of said tubular member, and a second group of metallic tubular elements embedded in said material and disposed in stepped relationship and with the terminal elements of the group respectively near the inside and outside surfaces of said tubular member, one of the terminal elements of one group surrounding one of the terminal elements of the other group and the other terminal element of said one group being disposed within the other terminal element of said other group, the overlapping areas of any pair of adjacent elements of each group being substantially equal to the overlapping areas of all other pairs of adjacent elements of the same group, the disposition of regions of high stress concentration longitudinally along the outside and inside of said tubular member being determined by the ratio of the total area of said overlapping areas for one of said groups of elements to the total area of said overlapping areas for the other group of elements.

5. A capacitor adapted to form an enclosing structure for the interrupting means of an electric circuit breaker comprising, a tubular member of dielectric material, a first group of metallic tubular elements embedded in said material and disposed in stepped relationship and with the terminal elements of the group respectively near the inside and outside surfaces of said tubular member, and a second group of metallic tubular elements embedded in said material and disposed in stepped relationship and with the terminal elements of the group respectively near the inside and outside surfaces of said tubular member, one of the terminal elements of one group being disposed around one of the terminal elements of the other group and the other terminal element of said one group being disposed within the other terminal element of said other group, the overlapping areas of any pair of adjacent elements of each group being substantially equal to the overlapping areas of all other pairs of adjacent elements of the same group, said overlapping areas for said first group of elements being different from said overlapping areas for said second group of elements.

WILFRED F. SKEATS.

References Cited in the file of this patent

UNITED STATES PATENTS

| Number | Name | Date |
| --- | --- | --- |
| 1,948,964 | Gay | Feb. 27, 1934 |
| 2,161,326 | Webb | June 6, 1939 |